Nov. 29, 1966     K. H. GRIMM     3,288,911
HIGH CAPACITY LOW IMPEDANCE CRANEWAY DUCT HAVING L-SHAPED
BUS BARS MOUNTED IN A PAIRED PHASE ARRANGEMENT
Filed Feb. 28, 1964
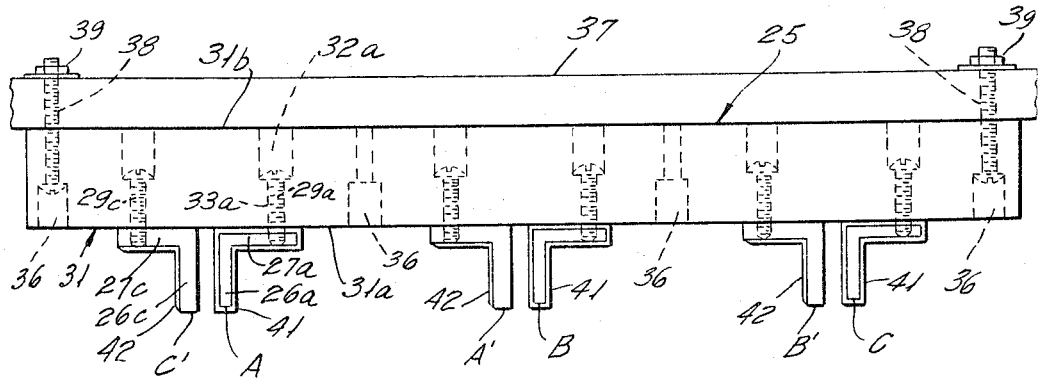
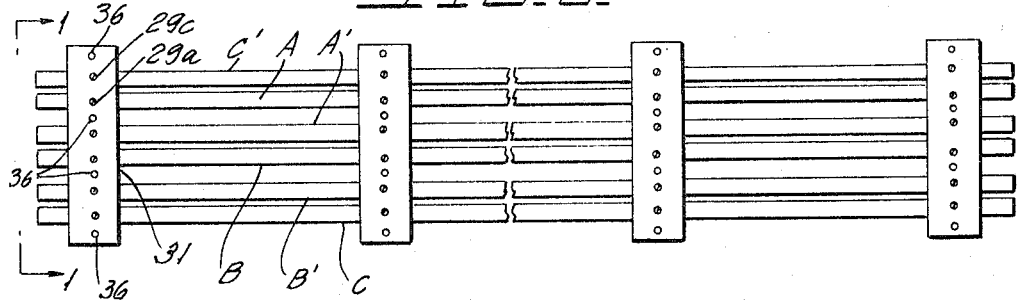
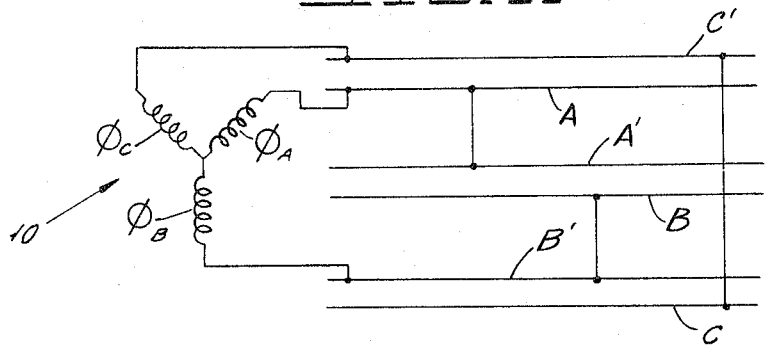
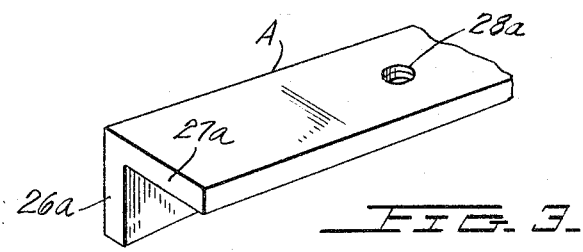
INVENTOR.
KEITH H. GRIMM
BY
OSTROLENK, FABER, GERB & SOFFEN
ATTORNEYS

United States Patent Office 3,288,911
Patented Nov. 29, 1966

3,288,911
HIGH CAPACITY LOW IMPEDANCE CRANEWAY DUCT HAVING L-SHAPED BUS BARS MOUNTED IN A PAIRED PHASE ARRANGEMENT
Keith H. Grimm, Detroit, Mich., assignor to I-T-E Circuit Breaker Company, Philadelphia, Pa., a corporation of Pennsylvania
Filed Feb. 28, 1964, Ser. No. 348,066
7 Claims. (Cl. 174—68)

This invention relates to electrical distribution duct systems in general and more particularly to a novel construction for a craneway duct.

Electrically powered cranes energized from polyphase systems usually require relatively high power inputs, for example, 600 volts at 1000 to 2000 amperes. A current collecting pantograph type trolley mounted to the bridge of the travelling crane engages the bus bars of the duct which are in turn connected to the source of electric energy.

The instant invention utilizes bus bars of L-shaped cross-section mounted and electrically connected in a so-called paired phase or low impedance arrangement. The bars of each pair are mounted back to back with one pair having an insulating covering and the face of the other bar having a stainless steel coating or other relatively good electrically conductive abrasive resistant metal constituting a surface to be engaged by the brushes of the trolley. The provision of abrasive resistant surfaces is especially useful for rapid transit applications where a trolley is mounted to a high speed train.

The utilization of bus bars having L-shaped cross-section results in a stronger unit so that longer sections may be fabricated and as a result fewer joints are required. The L-shaped cross section of the bus bars facilitates assembly of the duct and provides a clear contact area for the trolley collectors. Further, feed-in or tap-off devices may be installed at almost any location along the length of the duct run without the necessity of disassembling the duct units or the duct run. In addition, interphased ties to maintain current balance may readily be made at all joints and the paired phase arrangement results in efficient operation.

Accordingly, a primary object of the instant invention is to provide a novel construction for a trolley duct.

Another object is to provide a novel construction for a trolley duct in which the bas bars are mounted in a paired phase arrangement.

Still another object is to provide a novel construction for a trolley duct utilizing bus bars having L-shaped cross sections.

A further object is to provide a trolley duct for polyphase high current applications which is economical to produce and economical to operate.

These as well as further objects of this invention shall become readily apparent after reading the following description of the accompanying drawings in which:

FIGURE 1 is an end view, looking in the direction of arrows 1—1 of FIGURE 2, of a trolley duct constructed in accordance with the teachings of the instant invention.

FIGURE 2 is a plan view of one of the duct sections a plurality of which are joined together to form a duct run.

FIGURE 3 is a fragmentary perspective illustrating the bus bar construction.

FIGURE 4 is an electrical schematic showing the electrical connections between bus bars of the duct.

Now referring to the figures and more particularly to FIGURE 4 which illustrates the electrical connections between duct bus bars and three phase energizing source 10 to produce a so called paired phase arrangement of the type described in detail in U.S. Patent 2,287,502 issued June 23, 1942, to A. A. Togesen et al. In a duct having a paired phase arrangement the bus bars are arranged in pairs with the bars in each pair being relatively close to one another and the spacing between pairs being relatively great. In addition, the bars within each pair are connected to different phases of the energizing source 10. More specifically the bus bars of duct 25 are connected C'A–A'B–B'C. As is now well known to the art, this type of paired phase arrangement serves to reduce duct impedance thereby resulting in more efficient operation.

Each of the bus bars, A, A', B, B', C, C' is an elongated member of generally L-shaped cross sectional configuration and constructed of good electrically conductive material such as copper and aluminum. Since the construction and mounting of the bus bars within each of the pairs is identical only one pair of bus bars will be described.

Bus bars C'A are mounted in back to back relation and extend parallel to the longitudinal axis of duct 25. That is, legs 26a and 26c of bus bars A and C', respectively, extend parallel to each other and project in the same direction from insulating member 31. A plurality of insulating members 31 are axially spaced along duct 25. Screw 29a extends through clearance aperture 33a in member 31 and is received by threaded aperture 28a in mounting leg 27a of bus bar A thereby mounting bus bar A to the forward surface 31a of member 31. The head of screw 29a is disposed at the bottom of counterbore 32a in the rear surface 31b of member 31. Similarly, screw 29c extends through a clearance aperture in member 31 and is received by a threaded aperture in the mounting leg 27c of bus bar C'. It is noted that mounting legs 27a and 27c are positioned in substantially the same plane but extend in opposite directions from the other legs 26a and 26c of bus bars A and C', respectively.

Bus bar A is provided with insulating coating 41 which provides the insulation between the confronting surfaces of legs 26a and 26c. The inner surface of bus bar C' is provided with a face layer 42 of stainless steel or other relatively good electrically conductive abrasive resistant metal. Layer 42 provides a continuous readily accessible surface for engagement by a collector brush of a trolley (not shown).

It is noted that bus bars B and C are also provided with insulating layers 41 and that the inner surfaces of bus bars A' and B' are also provided with stainless steel layers 42. Thus, it is seen that all three brush engaged surfaces (layers 42) are positioned facing in the same direction. This arrangement simplifies trolley collector construction since all brushes of the trolley may be biased in the same direction.

Insulating members 31 are also provided with a plurality of countersunk clearance apertures 36 to facilitate mounting of duct 25 to the structural members of the building wherein duct 25 is installed. In FIGURE 1 such a structural member is illustrated as beam 37. Bolts 38 extend through the end ones of the four apertures 36 in member 31 and through clearance apertures in beam 37 where at the rear of beam 37 screws 38 are in threaded engagement with nuts 39 thereby serving to mechanically secure duct 35 to bar 37.

Feed-in or tap-off devices may readily be installed at the rear of the bus bar mounting legs. For instance, the same screws 29a, 29c which mechancally secure bus bars A and C' to insulating member 31 may also be utilized to make electrical connections to these bus bars. It should be obvious to one skilled in the art that jumpers may readily be connected wherever necessary between bus bars of the same phase, either in the same duct sections or across the joint of adjacent bus sections, and that interphase ties at all joints may readily be made.

While duct 25 has been illustrated as being mounted with insulating members 31 extending horizontally, it is obvious that insulators 31 may be mounted vertically to suit the convenience of the structural members of the building housing duct 25 and/or to suit the convenience of mounting the trolley collector. While duct 25 has been illustrated as an open device it should be apparent to those skilled in the art that a suitable housing may be be provided with the housing construction being dictated by heat dissipation requirements and the further requirement that the collector brushes must have access to the internal surface of layers 42.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. An elongated duct system for the distribution of multiphase electrical energy; said system including a first and second conductor for each phase of said system; mounting means positioning said conductors of all phases spaced from each other and generally parallel to the longitudinal axis of the duct; means electrically connecting said conductors in a paired phase arrangement; said first of the conductors of each phase having a generally L-shaped cross-section including a first leg and a second leg; said first leg being in engagement with said mounting means; said first legs of all of said first conductors positioned in substantially the same plane; said second legs of all of said first conductors extending in the same direction from said plane and generally parallel to each other; said mounting means being comprised of a plurality of insulating members extending transverse to the longitudinal axis of the duct and spaced along said axis; all of said conductors being disposed forward of said members.

2. An elongated duct system for the distribution of multiphase electrical energy; said system including a first and a second conductor for each phase of said system; mounting means positioning said conductors of all phases spaced from each other and generally parallel to the longitudinal axis of the duct; means electrically connecting said conductors in a pair phase arrangement; said first of the conductors of each pase having a generally L-shaped cross-section including a first leg and a second leg; said first leg being in engagement with said mounting means; said first legs of all of said first conductors positioned in substantially the same plane; said second legs of all of said first conductors extending in the same direction from said plane and generally parallel to each other; each of said first legs extending in the same directions from each of said second legs; each of the other conductors of said pairs being of generally L-shaped cross-section including a third leg and a fourth leg; said third legs of each of said other conductors of said pairs being engaged by said mounting means; said fourth legs of each of said other conductors of said pairs extending generally parallel to said second legs.

3. A duct system as set forth in claim 2 in which said fourth legs and said second legs extend in the same direction from said mounting means; said first leg and said third leg of each pair of conductors extending in opposite directions.

4. A duct system as set forth in claim 3 in which said second and said fourth legs of each pair of conductors are closely spaced; and insulating means in the spaces between said second and said fourth legs of each of said pairs of conductors.

5. A duct system as set forth in claim 4 in which said insulating means is comprised of a coating on said other conductors of said pairs of conductors.

6. A duct system as set forth in claim 4 in which said one conductors are constructed of a first metal; a layer of a second metal on an accessible portion of each of said one conductors; said layer of said second metal operatively positioned for wiping engagement by collector brushes of a trolloy; said second metal being harder than said first metal.

7. A duct system as set forth in claim 6 in which said insulating means is comprised of a coating on said other conductors of said pairs of conductors.

References Cited by the Examiner

UNITED STATES PATENTS

| | | | |
|---|---|---|---|
| 2,942,225 | 6/1960 | Ricci et al. | 174—99 X |
| 3,042,761 | 7/1962 | Mayer | 191—23 X |
| 3,155,207 | 11/1964 | Blemly et al. | 191—23 |

LEWIS H. MYERS, *Primary Examiner.*

J. F. RUGGIERO, *Assistant Examiner.*